No. 634,823. Patented Oct. 10, 1899.
I. R. JOHNSON.
BICYCLE FRAME.
(Application filed Apr. 6, 1899.)
(No Model.) 2 Sheets—Sheet 1.

WITNESSES:
E. Wolff.
Chas. E. Roenger.

INVENTOR
Isaac R. Johnson.
BY
Hauff & Hauff
ATTORNEYS

No. 634,823. Patented Oct. 10, 1899.
I. R. JOHNSON.
BICYCLE FRAME.
(Application filed Apr. 6, 1899.)

(No Model.) 2 Sheets—Sheet 2.

WITNESSES:
E. Wolff
Chas. E. Beusgen

INVENTOR
Isaac R. Johnson.
BY
Hauff & Hauff
ATTORNEYS

UNITED STATES PATENT OFFICE.

ISAAC R. JOHNSON, OF NEW YORK, N. Y., ASSIGNOR OF ONE-HALF TO JAMES E. GARNER, OF SAME PLACE.

BICYCLE-FRAME.

SPECIFICATION forming part of Letters Patent No. 634,823, dated October 10, 1899.

Application filed April 6, 1899. Serial No. 711,934. (No model.)

*To all whom it may concern:*

Be it known that I, ISAAC R. JOHNSON, a citizen of the United States, residing at New York, borough of Manhattan, in the county of New York, in the State of New York, have invented new and useful Improvements in Bicycles or Velocipedes, of which the following is a specification.

By means of this invention the frame of a vehicle, such as a bicycle or velocipede, can be made separable or dismountable, so that it can be compactly stored—as, for example, in trunks or compartments or other small places, or conveniently carried, as in elevators, cars, or the like.

This invention is set forth in the following specification and claims, and illustrated in the annexed drawings, in which—

Figure 1:
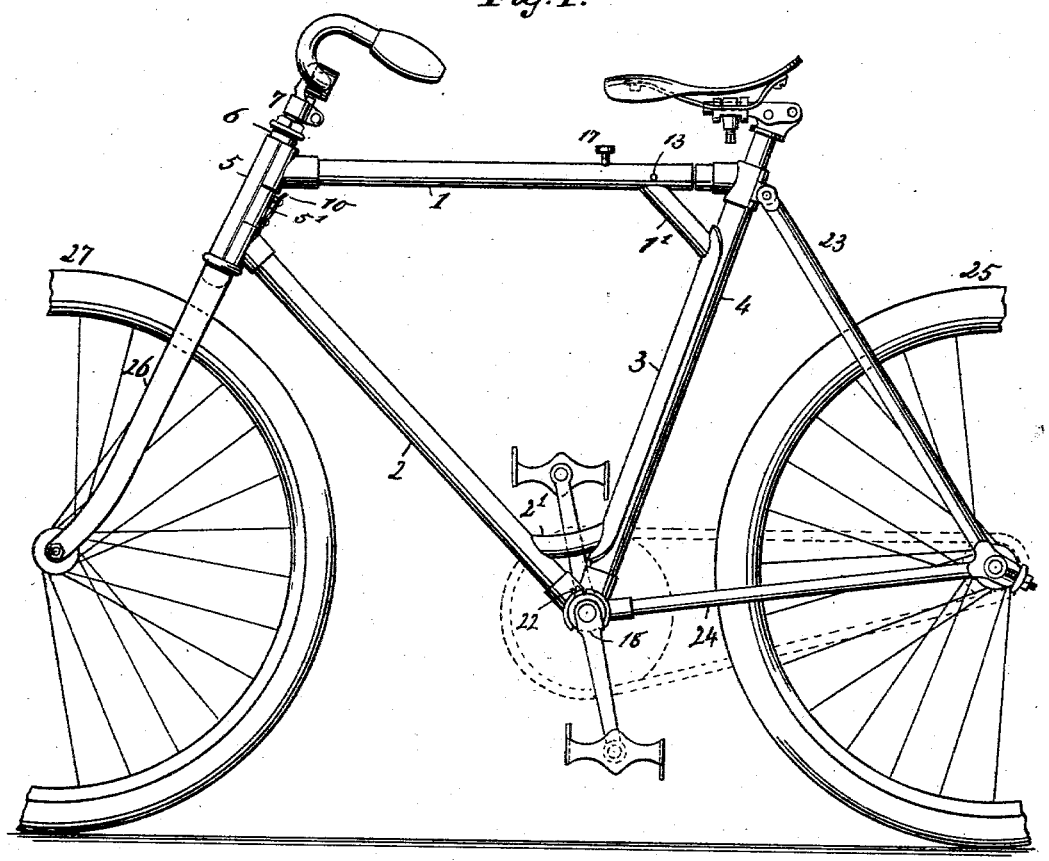
Figure 2:
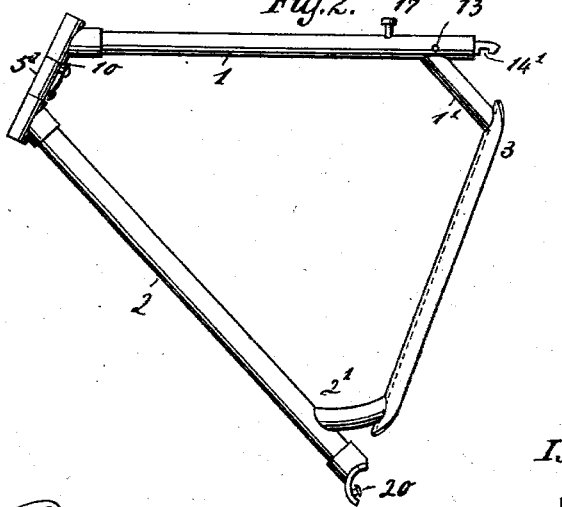
Figure 3:
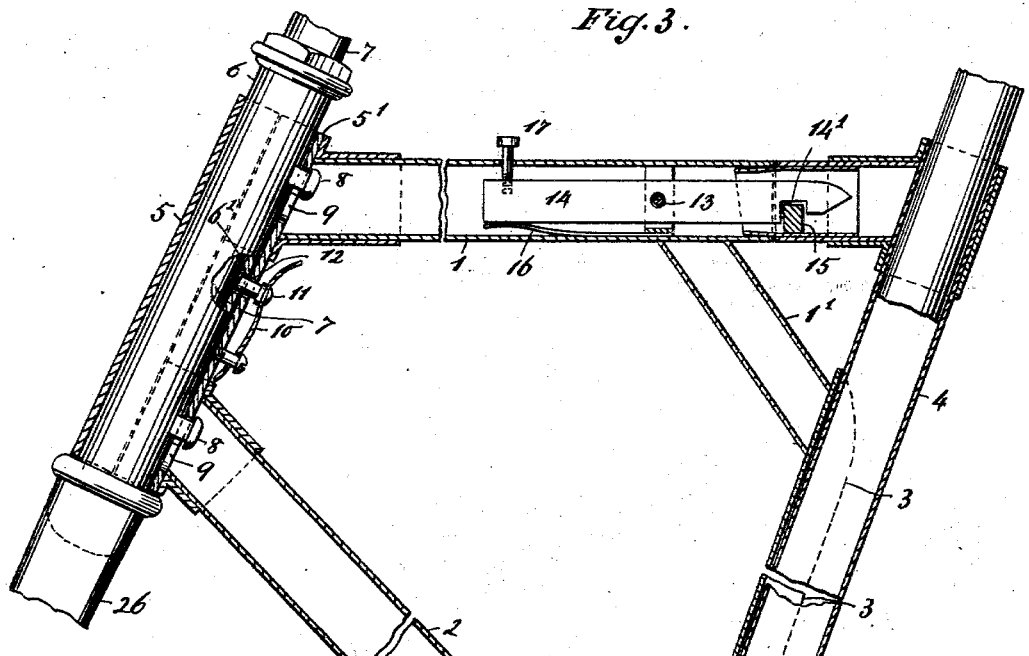
Figure 6:
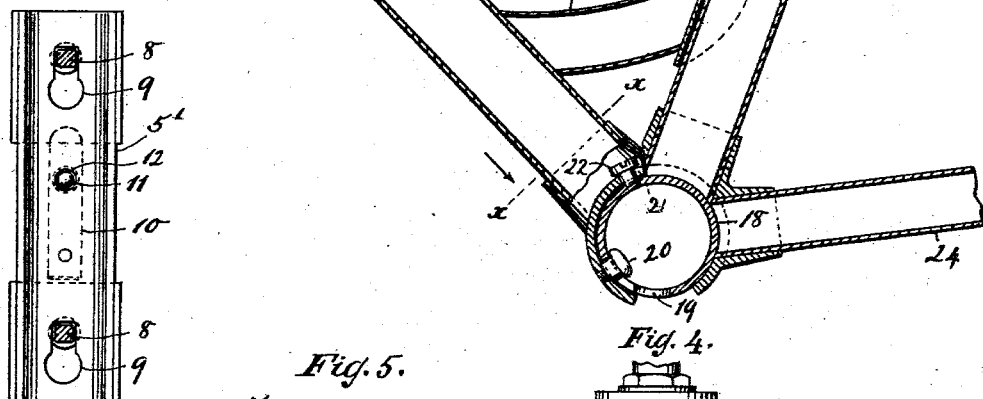
Figure 5:
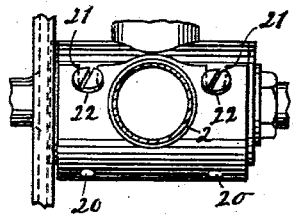
Figure 4:
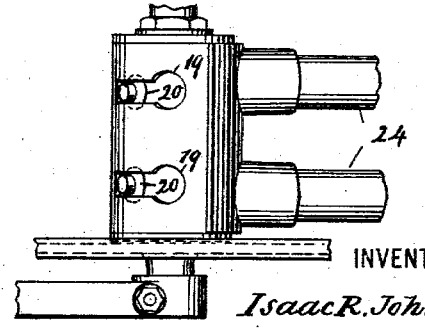

Figure 1 is a side elevation of a bicycle or vehicle. Fig. 2 is a detail view of a frame. Fig. 3 is a sectional side elevation of Fig. 1. Fig. 4 is an inverted plan view of the crank-hanger. Fig. 5 is a section along $x\ x$, Fig. 3. Fig. 6 is an interior view of part of the steering-head.

The diamond comprises the upper tube 1, the lower tube 2, and a sheath or half-tube 3, which sits over the seat-post tube 4. The rear sheath or tube-section 3 is secured to upper and lower tubes 1 and 2 by small tubes 1' and 2', respectively. The steering-head consists of two sections or parts, the front half 5 being of one piece with or secured to the casing or sleeve 6, in which sits the handle-bar or steering-post 7. The other half 5' is of one piece with or secured to the diamond. The diamond and steering-head are joined by a slot and headed-stud connection. Casing or tube 6 is provided with headed studs 8, which enter the slots at their enlarged portions 9, the slots being of keyhole form, and the diamond is then pushed down, so that the studs 8 will come to rest in the narrow slot portions, where the heads of the studs overlap the slot edges, and thus effect a tight and secure joint, which can be locked by a spring 10, one end of which is secured to the head or front sheath 5', while the other end carries a stud or pin 11, which under tension of the spring enters an aperture 12, Fig. 3, in head or tube section 5', corresponding with an opening 6' in tube 6, so that the latter is prevented from jostling loose the fastenings 8 9.

To dismount the diamond from the head, the stud 11 is pulled out from openings 12 6' and the diamond is slightly lifted, when the two portions will readily come apart. After this the diamond can be disconnected from the seat-post tube 4 or rear-wheel portion in the following way:

In the upper tube 1 is fulcrumed at 13, Fig. 3, a lever 14, having at one end a recess 14', so that it can catch or sit over a projection 15, located in that small portion of the upper tube which is of one piece with the seat-post tube 4. The lever 14 is held locked or in engagement by spring 16. Such engagement binds the upper tube, and consequently the rear-frame portion and the diamond are connected. To separate these two parts, the spring end of lever 14 is depressed by means of button 17 extending through upper tube 1, so that the other end of the lever rises or moves out of engagement with projection 15. The upper tube 1 will now be free or come apart, and the diamond is slightly lowered, so as to revolve about the crank-hanger casing or sleeve 18.

The lower tube 2 of the diamond is connected to the crank-hanger by the same kind of fastenings as secure the diamond and steering-head or front-wheel portion—namely, the keyhole-slots 19 and headed studs 20—and when the parts are assembled the studs 20 sit in the narrow portions of slots 19. Hence the lowering of the diamond upon freeing catch 14 will move heads 20 out of the narrow portions and allow their passing out at the wide portions of slots 19, so that the diamond and the rear-wheel portion will now be disconnected. A reverse movement is employed to assemble the portions. The lower tube 2 where it sits over the crank-hanger has slots 21, which sit about studs 22, so as to steady the portions when adjusted.

By calling the inner or middle frame or part 1 3 by its conventional name of "diamond" it is of course understood that the invention is not limited to a diamond frame; but this invention can be employed wherever applicable, as it would be useful, for example, on a lady's or drop frame. The seat-post tube 4, with the branches 23 and 24, form a frame for the rear wheel 25, which wheel-frame at its crank-hanger 18 can have the pedals and other wheel-driving appliance. The swiveling post 7, with fork 26 and front or steering wheel 27, serves for guiding or steering the vehicle. When the parts are assembled, the slots or holes 19 could be suitably closed or covered, as by a spring-hinge cover or other appliance, which excludes dust or foreign matter from entering the crank-hanger or lodging on the pedal-shaft. In mentioning a bicycle it should be noted that the invention can be applied to other velocipedes or vehicles—as, for example, to a three or four wheel device.

What I claim as new, and desire to secure by Letters Patent, is—

1. A bicycle-frame having a front and rear sheath or tube-section, and a steering-post sleeve and seat-post tube to which the sheaths are removably connected substantially as described.

2. A wheel-frame having a crank-hanger and a saddle-post part or tube 4, combined with a second frame, a slot-and-stud connection for uniting the second frame and the crank-hanger, and a catch for uniting the second frame and the tube 4 substantially as described.

3. A wheel-frame having a crank-hanger and a saddle-post part or tube 4, combined with a second frame, a slot-and-stud connection for uniting the second frame and the crank-hanger, and a catch for uniting the second frame and the tube, said second frame having a sheath or section 3 made to sit along said tube substantially as described.

4. A wheel-frame having a crank-hanger and a saddle-post part or tube, combined with a second frame, a slot-and-stud connection for uniting the second frame and the crank-hanger, and a catch for uniting the second frame and the tube, said second frame having a sheath or section 3 made to sit along said tube, and said frames having a steadying slot and stud 22 substantially as described.

5. A steering-head section and a frame having a slot-and-stud connection for detachably uniting said head-section and frame, and a spring-actuated stud or lock 11 made to engage the head-section and frame substantially as described.

6. A steering-post tube 6 and a sheath or head-section 5, combined with a frame having a sheath or head-section 5' made to sit about the tube and against the first-named section, said tube and frame-section 5' being detachably connected substantially as described.

In testimony whereof I have hereunto set my hand in the presence of two subscribing witnesses.

ISAAC R. JOHNSON.

Witnesses:
W. C. HAUFF,
E. F. KASTENHUBER.